E. HUMBERT.
PROCESS OF MAKING METALS IN ELECTRIC FURNACES.
APPLICATION FILED APR. 26, 1917.
1,252,443.
Patented Jan. 8, 1918.
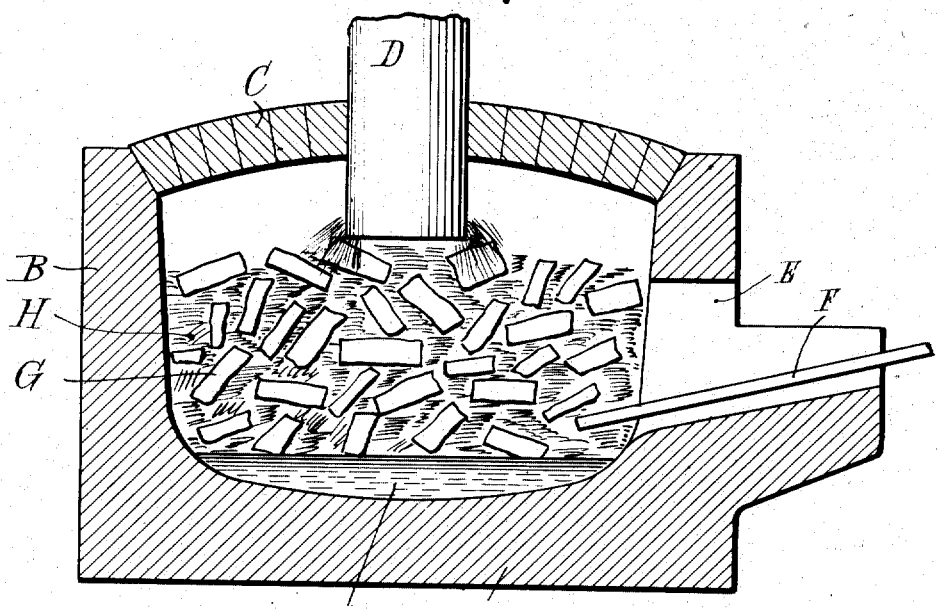
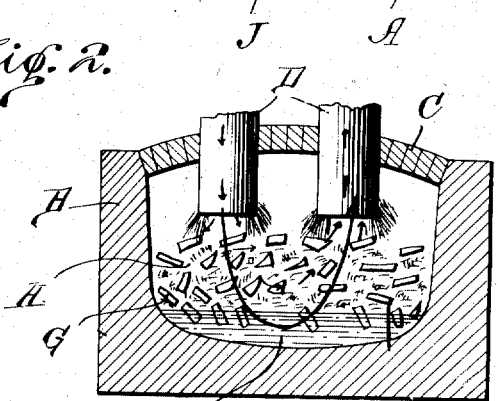

UNITED STATES PATENT OFFICE.

ERNEST HUMBERT, OF WELLAND, ONTARIO, CANADA.

PROCESS OF MAKING METALS IN ELECTRIC FURNACES.

1,252,443.     Specification of Letters Patent.     Patented Jan. 8, 1918.

Application filed April 26, 1917. Serial No. 164,793.

*To all whom it may concern:*

Be it known that I, ERNEST HUMBERT, a citizen of the Republic of France, residing in Welland, Ontario, Canada, have invented certain new and useful Improvements in Processes of Making Metals in Electric Furnaces, of which the following is a specification.

My invention aims to provide a process of producing a metal containing a certain percentage of carbon in the electric furnace. The invention may be applied, for example, to making iron or steel of varying percentages of carbon, phosphorus and other ingredients. As specifically described hereinafter, it provides a process by which steel of practically any desired quality and composition can be made in the electric furnace from pig iron or cast iron (these two being included in the term "cast iron" as used hereinafter) or steel scrap, or any combination of these; or in fact from any of the raw materials generally used for making steel; the cost of my improved process being extraordinarily low and the process having other advantages and characteristics referred to in detail hereinafter; the invention being more exactly defined in the claims at the end of this specification.

The raw materials generally used for making steel are cast iron and steel scrap. All cast iron is sometimes used, or all steel scrap, or more frequently a mixture of the two in varying proportions, depending on the character of the available supply.

Cast iron generally contains around 3.50 per cent. of carbon and 1.50 per cent. of silicon, whereas steel contains generally less than 1 per cent. of carbon; accordingly an oxidizing ingredient is added to the charge of cast iron to remove the excess of carbon and silicon. Iron ore or other iron oxid has been used as the oxidizing material. This "pig and ore" method has not been found commercially practicable for making steel in electric furnaces.

If the iron ore is added when the cast iron is molten, a violent boil results. The iron ore must be added in small quantities at a time in order to prevent the metal from running out through the door of the furnace. If the furnace is of the electrode type (as for example the Heroult furnace) there will be a considerable wearing of the electrodes caused by the slag, which is almost pure molten iron oxid, boiling around the electrodes and washing against them. Also if the iron ore is charged too fast, it will cause complete freezing of the bath and the reactions will cease, as the addition of cold iron ore lowers the temperature of the charge, and also the lower percentage of carbon in the charge raises the melting point thereof. The same troubles arise if the iron ore is charged with the cast iron in the cold state. A violent boil is created when the charge becomes liquid, which necessitates the stoppage of the electric current and the raising of the electrodes out of the bath to prevent them from being oxidized and worn out by the washing of the slag against them. Also the foaming of the slag to the roof and the boiling on the banks of the furnace cause an abnormal wearing of the roof and lining. Therefore, it appears that the adding of iron ore to a charge of cast iron, either when the iron is in a liquid state or when it is in a solid state, is a slow and expensive process of making steel, requiring a large consumption of current and wear on the electrodes and the roof and lining of the furnace. The same considerations apply if the charge is chiefly cast iron and a small part scrap, a sufficient quantity of ore or other oxidizer being necessary to oxidize out the excess of carbon in the cast iron.

When the charge consists wholly or chiefly of steel scrap this may contain a higher percentage of carbon than is desired in the steel to be produced, in which case iron ore or other oxidizer has been used, as for a charge of cast iron, and the difficulties have been of the same kind, though not to so great an extent. Or, if the carbon content of the charge is less than that in the steel to be produced carbon must be added and this has to be done by the addition of coke or the like in excess of the quantity theoretically required and ore or similar oxidizer to reduce the carbon content to that desired; so that again we meet with difficulties of the same sort.

Additional difficulties are presented when it is desired to make steel of low carbon content, and it has been found nearly impossible, in the commercial sense, to secure such a product in the electric furnace. This is because it is necessary to carry on the metal a slag high in iron oxids to oxidize the carbon when it is present only in small percentage, for example 0.30 per cent. or below; and because at the temperature which is necessary to oxidize this carbon, the iron oxid from the slag goes into solution in the steel; and because to obtain a low carbon steel properly deoxidized it is necessary to make additions of ferro-silicon or other strong deoxidizer.

Having experienced for years the above mentioned difficulties, I have devised a process to overcome them, at the same time improving the quality of the steel and reducing the cost of its production.

According to the present invention I supply the necessary oxygen, either wholly or to a large extent, by introducing air or equivalent oxidizing fluid, which eliminates carbon to the desired extent. Preferably the air, cold or preheated, is blown through the solid material only of the charge; but for extracting small quantities of carbon (as for example, near the end of an operation when it is found that the liquid charge contains carbon slightly in excess of that desired) the air may be applied to the molten material.

Referring to a particular process in which the invention is used, the charge is introduced in solid condition and brought to an incandescent temperature, either by reason of the heat remaining in the furnace from the previous charge, or by means of the electric current. The current being continued so as to maintain a supply of heat, air is blown into the solid incandescent material of the charge. As the melting commences and proceeds a molten bath is collected at the bottom, with the solid material above it. The application of the air is continued upon the solid portion of the charge until it is all melted. The blowing in of air is then stopped and the molten charge refined as usual in the electric furnace to the desired product, with additions of ferro-silicon, nickel, chromium or other ingredients where alloy steel is to be made. The oxygen of the air oxidizes the carbon, silicon and phosphorus present in the charge, producing a great rise of temperature, as it is known that one kilogram (2.2 lbs.) of carbon oxidized to $CO_2$ produces 8100 calories, one kilogram of silicon to $SiO_2$ produces 7830 calories, and one kilogram of phosphorus to $P_2O_5$ produces 5965 calories. With a charge of a given composition it is easy to calculate the amount of heat that will be generated by the oxidizing of carbon, silicon and phosphorus, and consequently the amount of electric current saved.

As an example: I work as follows with a six ton Heroult furnace, aiming at a steel containing 0.45 per cent. carbon and using scrap containing around 0.40 per cent. carbon and a certain quantity of cast iron borings amounting to about 20 per cent. of the charge. About 400 pounds of lime is mixed with the scrap to take care of the products of oxidation of the silicon and phosphorus. After the furnace is emptied and customary repairs made the electrodes are raised as high as possible and the scrap, cast iron and lime are charged in, taking care to have the furnace filled as much as possible. The electrodes are lowered and the current started. It takes about half an hour to charge the furnace and at the end of the charging part of the scrap is red hot from the heat of the furnace which makes it possible to start blowing the air as soon as the current is started. I have a rubber hose connected on an air line from an air compressor. At the end of this hose I have a one inch steel pipe approximately ten feet long; I place it through the scrap about three feet inside the furnace through one of the doors. At the beginning of the blowing the steel pipe is inclined slightly downward but during the melting operation the pipe is placed in the horizontal position so as not to come in contact with the liquid bath. As soon as the charge is completely melted the air is shut off and the pipe removed from the furnace. For the example given there will be needed about 38750 liters of air, per ton of charge. Knowing the volume of air blown into the furnace per minute we can calculate with considerable exactness the length of time during which the melting down and blowing operation should be carried on in order to secure steel of the desired composition.

Comparing my process with prior processes to make the same steel in the electric furnace from the same charge, the charge was melted with my process in two-thirds of the time required for the old process. Again when the charge is melted by my process the temperature of the bath is sufficient to allow the immediate pouring of the heat; whereas with the old process the molten metal is comparatively cold so that it is even difficult to take a test because of the freezing of the steel in the test spoon. Where the metal has been melted by my process a test piece taken immediately thereafter will forge under the hammer without showing the cracks which would be indicative of the presence of oxid in the metal.

It is not necessary to use air under high pressure. An ordinary blower will be sufficient, the quantity of air required depending on the quantity of the elements in the charge which are to be oxidized.

With my process there is no substantial wear on the furnace, because the charge is tapped a few minutes after it becomes molten; say fifteen to thirty minutes depending on the degree of subsequent refinement; or on the extent of the additions required, the charge being maintained molten during this time by continuing the electric current. The process presents no difficult departure from ordinary practice in charging, operating and emptying the furnace. A melter familiar with the ordinary practice can use my process successfully and easily at once.

Compared with the old method on a charge consisting entirely or chiefly of cast iron, my process saves 50 per cent. of the time required. When the charge is all or chiefly scrap steel my process saves about 30 per cent. of the time required.

With the ore previously used as an oxidizer, it was difficult to calculate the exact quantity necessary. This can be done much more reliably with air, the oxygen content of which is known accurately and the volume of which can be measured closely. When the air is blown on the incandescent solid metal of the charge the carbon monoxid formed at the point where the air strikes the metal is converted immediately into carbon dioxid by burning at the mouth of the nozzle with a white flame which heats the charge throughout, the products of combustion escaping through the door through which the nozzle is inserted. This is the simplest method of using the process, but of course the furnace may be especially equipped with nozzles or ports for the admission of air and with passages for the escape of the products of combustion. The heat adjacent to the mouth of the nozzle melts away the metal so as to clear a space and make it easy to manipulate the nozzle so as to raise its mouth as the level of the molten portion rises so as to maintain the blowing on the solid portion of the charge. Not only is there a saving of current and electrodes by reason of the saving of time involved, but the operation may be carried on with a smaller amperage than has been required in previous processes and there is considerably less wear in a given period of time on the roof and lining of the furnace. Also steel of better quality is produced. The carbon, silicon and phosphorus in the iron are oxidized before the iron. The quantity of iron oxids in the slag is so small that there is no tendency of iron oxids to go into solution in the metal. A state of equilibrium in this respect between the metal and the slag is found when the slag contains about 13 per cent. FeO, and my process produces less than this percentage. Even in making low carbon steels there is no overoxidation of the metal since there is neither iron ore added nor a strongly oxidizing slag maintained.

When low carbon scrap steel is used exclusively or to such an extent that carbonaceous materials have to be added, such materials may be coke, coal, oil or the like, and the oxidation of these by the air blown into the furnace is similar to the effect of the air on a charge of higher carbon content.

The specific process described is capable of considerable variation without departure from the invention. It is not essential, for example, that all the oxidizing be done with air. A portion of the oxidizer may be in the form of ore or equivalent solid oxid in special cases. Instead of commencing the air injection while the entire mass is solid, we can start with a charge which is partly molten and partly solid; or, the initial charge being entirely solid, we can wait until it is partly melted before applying the air. And though, as a rule, the best results are obtained by blowing the air only into the solid charge, the air may be blown onto or through the liquid charge when the latter is of such a low carbon content, or has been reduced to such a low carbon content, that there will not be an excessive boiling under the reaction.

The heat produced by the electric current serves to start the reaction and also to finish the refining of the product. And when the furnace is running regularly the initial heat comes from that absorbed by the lining of the furnace during the previous heat as well as from the electric heat which is supplied to the new charge. Any type of electric furnace can be used but I prefer an arc furnace and especially one of the Heroult type, in which electrodes depend through the roof, striking arcs between their lower ends and the charge, with an automatic regulating mechanism which lowers the electrodes as the arc lengthens by the settling down of the charge or by the burning away of the lower end of the electrode. This is a closed furnace (except for the doors) and when the air supply is stopped the operations take place in a non-oxidizing atmosphere. The arcs are struck between the lower end of each electrode and the solid charge, the current passing from one arc through the charge to another arc, as shown in Figure 2. There are analogous types in which an arc is struck from an electrode and the current passes through the charge and out by way of a conducting bottom or other conductor in contact with the charge. Still other types use the radiant and reflected heat from an arc located above the charge. Any type may be used for my process, though I prefer those in which one or more arcs are struck between the electrode and the charge.

Figs. 1 and 2 of the accompanying drawings are more or less diagrammatic views at right angles showing sections through an electric arc furnace showing a mode of carrying out the process. The furnace has a hearth A, sides B and roof C through which passes the electrode D (one or more) extending down approximately to the top of the charge so as to strike the arc. A doorway E is opened and a nozzle consisting of a long pipe F, say about ten feet long, is thrust into the lower part of the charge, the nozzle receiving air from a flexible pipe or hose connected to a blower. The charge is built up as indicated of scrap G and cast iron borings H and in the lower portion there forms a bath J of molten metal. The solid portion of the charge is gradually melted and the nozzle F elevated as previously described until the entire charge is molten. The nozzle F is then withdrawn, the doors shut, and the refining operation proceeded with as described, after which the finished product is tapped or poured.

What I claim is:

1. In the making of steel in an electric furnace, introducing the charge in solid condition, applying heat by the electric current and introducing air into the solid material of the charge to oxidize the same before melting, continuing such operation upon the solid portion of the charge until it is all melted, and refining the molten charge to the desired product.

2. In the making of steel in an electric furnace, from a charge consisting chiefly of cast iron, introducing the charge in solid condition, applying heat by the electric current and introducing air into the solid material of the charge to oxidize the same before melting, and continuing such operation upon the solid portion of the charge until it is all melted.

3. In the making of steel in an electric furnace from a charge which is at least in part solid, introducing air into the solid material of the charge to oxidize the same before melting, and continuing such operation upon the solid portion of the charge until it is all melted.

4. In the making of steel in an electric furnace introducing a substantially complete charge, applying heat by the electric current and introducing air to lower the carbon content to the desired percentage.

5. In the producing of a metal containing a certain percentage of carbon, the method which comprises introducing into an electric furnace a charge which contains an excess of carbon and which is at least in part solid, applying heat by the electric current and introducing air into the solid material of the charge to combine with the excess of carbon, and melting substantially the entire charge by the combined heat of combustion and electric current and then cutting off the air supply and finishing with the current alone.

6. In the producing of a metal containing a certain percentage of carbon, the method which comprises introducing into an arc furnace a substantially complete charge which contains an excess of carbon and which is at least in part solid, applying heat by the electric current and introducing a current of air alone into the solid material of the charge to combine with the excess of carbon.

7. In the producing of a metal containing a certain percentage of carbon, the method which comprises introducing into an arc furnace a substantially complete charge which contains an excess of carbon and which is at least in part solid, striking an arc from an electrode to the solid material of the charge and introducing a current of air alone into the solid material of the charge to combine with the excess of carbon.

In witness whereof, I have hereunto signed my name.

ERNEST HUMBERT.

Copies of this patent may be obtained for five cents each, by addressing the "Commissioner of Patents, Washington, D. C."